(12) United States Patent
Arthurs

(10) Patent No.: US 10,030,325 B2
(45) Date of Patent: Jul. 24, 2018

(54) SCRIM COATED PRODUCTS HAVING A COEXTRUDED MULTI-LAYER COATING ON ONE SIDE THEREOF

(71) Applicant: Intertape Polymer Corp., Sarasota, FL (US)

(72) Inventor: Trevor Arthurs, Truro (CA)

(73) Assignee: Intertape Polymer Corp., Sarasota, FL (US)

( * ) Notice: Subject to any disclaimer, the term of this patent is extended or adjusted under 35 U.S.C. 154(b) by 97 days.

(21) Appl. No.: 15/165,692

(22) Filed: May 26, 2016

(65) Prior Publication Data

US 2016/0348286 A1     Dec. 1, 2016

Related U.S. Application Data

(60) Provisional application No. 62/168,401, filed on May 29, 2015.

(51) Int. Cl.
     *D03D 1/00*           (2006.01)
     *D04H 13/00*        (2006.01)
     (Continued)

(52) U.S. Cl.
     CPC ............... *D03D 9/00* (2013.01); *B32B 27/12* (2013.01); *D03D 1/00* (2013.01); *D03D 15/0088* (2013.01); *D03D 19/00* (2013.01); *B32B 3/30* (2013.01); *B32B 5/024* (2013.01); *B32B 5/026* (2013.01); *B32B 5/08* (2013.01); *B32B 27/08* (2013.01);
     (Continued)

(58) Field of Classification Search
None
See application file for complete search history.

(56) References Cited

U.S. PATENT DOCUMENTS 7,338,574 B2 *    3/2008   Spohn .................... B29C 41/32
                                                                  156/246
7,594,375 B2      9/2009   Dussault
                         (Continued)

FOREIGN PATENT DOCUMENTS

EP            0769585       10/1996

OTHER PUBLICATIONS

[NPL-1] POREX Filtration Group "Ethylene Vinyl Acetate" (Oct. 2011); <http://www.porex.com/technologies/materials/porous-plastics/ethyl-vinyl-acetate/>. (Year: 2011).*

*Primary Examiner* — David Sample
*Assistant Examiner* — Donald M Flores, Jr.
(74) *Attorney, Agent, or Firm* — Jeffrey T. Placker; Holland & Knight LLP

(57) ABSTRACT

Protective coverings are disclosed that have a scrim made up of warp and weft members that define a plurality of interstices coated on only a first major surface thereof by a multi-layer coating with a first layer of the multi-layer coating juxtaposed to the first major surface, and penetrating into the interstices of the scrim to co-define, with the warp and weft members, an opposing second major surface of the scrim. The first layer of the multi-layer coating has a melting point below 100° C. and comprises a copolymer of ethylene, and provides the co-defined opposing second major surface of the scrim with a coefficient of friction of at least 0.5 when tested with dry leather and at least 0.7 when tested with dry rubber.

19 Claims, 1 Drawing Sheet

(51) Int. Cl.
| | |
|---|---|
| *D03D 9/00* | (2006.01) |
| *B32B 27/12* | (2006.01) |
| *D03D 15/00* | (2006.01) |
| *D03D 19/00* | (2006.01) |
| *B32B 5/02* | (2006.01) |
| *B32B 5/08* | (2006.01) |
| *B32B 27/08* | (2006.01) |
| *B32B 27/18* | (2006.01) |
| *B32B 27/30* | (2006.01) |
| *B32B 27/32* | (2006.01) |
| *B32B 3/30* | (2006.01) |

(52) U.S. Cl.
CPC ............ *B32B 27/18* (2013.01); *B32B 27/302* (2013.01); *B32B 27/306* (2013.01); *B32B 27/308* (2013.01); *B32B 27/32* (2013.01); *B32B 2260/021* (2013.01); *B32B 2260/046* (2013.01); *B32B 2262/0253* (2013.01); *B32B 2262/14* (2013.01); *B32B 2270/00* (2013.01); *B32B 2307/71* (2013.01); *B32B 2307/72* (2013.01); *B32B 2307/7265* (2013.01); *B32B 2307/744* (2013.01); *B32B 2419/06* (2013.01); *B32B 2571/00* (2013.01); *D10B 2321/021* (2013.01); *D10B 2321/022* (2013.01); *D10B 2505/20* (2013.01)

(56) References Cited

U.S. PATENT DOCUMENTS

| | | | |
|---|---|---|---|
| 7,607,280 | B2 | 10/2009 | Dussault |
| 7,745,353 | B2 | 6/2010 | Arthurs et al. |
| 7,836,666 | B2 | 11/2010 | Dussault |
| 7,882,671 | B2 * | 2/2011 | Bruce .................... B32B 27/12 |
| | | | 264/173.11 |
| 7,997,050 | B2 | 8/2011 | Dussault |
| 2004/0192130 | A1 | 9/2004 | Baciu et al. |
| 2007/0044397 | A1 * | 3/2007 | Wiercinski ................ E04D 5/10 |
| | | | 52/177 |
| 2007/0059999 | A1 | 3/2007 | Arthurs |
| 2010/0178827 | A1 * | 7/2010 | Thai ......................... B32B 7/14 |
| | | | 442/245 |

\* cited by examiner

SCRIM COATED PRODUCTS HAVING A COEXTRUDED MULTI-LAYER COATING ON ONE SIDE THEREOF

RELATED APPLICATIONS

This application claims the benefit of U.S. Provisional Application No. 62/168,401, filed May 29, 2015, which is incorporated herein by reference.

TECHNICAL FIELD

The present disclosure relates to open weave or knitted scrims having a coextruded multi-layer coating on one side thereof to impart beneficial, selected properties thereto.

BACKGROUND

In both residential and commercial roofing applications, a roof covering material is utilized to provide the main water protection barrier. Whether the primary roof covering material comprises composite shingles, metal panels or shingles, concrete or clay tiles, wood shakes, or slate, a primary roof covering material is used to protect the building interior from water ingress. In addition to the roof covering material, roofing underlayment is often used beneath the primary roof covering material. The roofing underlayment acts as a water and moisture barrier.

It is desirable for roofing underlayment to provide a surface which has a sufficiently high coefficient of friction ("COF") to reduce slippage of the roofing underlayment relative to the roof and also the bottom of shoes or boots and the top surfaces of the roofing underlayment, in particular when an installer walks on the roofing underlayment. The phrase "high coefficient of friction" in this document means a sliding coefficient of friction of at least 0.5 when tested with dry leather and at least 0.7 when tested with dry rubber (per CAN/CGSB-75.1-M88).

Roofing underlayment should be easily affixable to a roofing surface, for example by nailing or adhesion. They should ideally be impermeable to moisture. High tensile and tear strengths are also desirable to reduce tearing during application and exposure to high winds. Also, roofing underlayment should be light in weight to facilitate ease of transport and application, and should be able to withstand prolonged exposure to sunlight, air and water.

In another industry, lumber wrapping, a covering material that is useable in automatic lumber wrapping machines, such as disclosed in U.S. Pat. Nos. 7,594,375; 7,607,280; 7,836,666; and 7,997,050 is desirable to have improved properties afforded by the scrim coated products disclosed herein. The production of a lumber wrap from a flat sheet requires the flat sheets to be thermally welded together. The issue with standard, two side coated woven products for use as lumber wrap is that the welds are stressed in peel when the resultant welded lumber wrap is stretched over the lift of lumber. The stresses induced to create this stretch are sufficient to cause weld failure.

Thus, scrim coated products made from a polymer material that meets the above-mentioned needs and, in particular, has the necessary high COF and/or a low melting point material present on both sides of the scrim while only applying a coating to one side of the product are needed for these industries.

SUMMARY

Various embodiments relate to a roofing material and more particularly to a roofing underlayment including anti-slip properties. Other embodiments relate to an end product, lumber wrap, suitable for use in automatic lumber wrapping machines. Both types of products benefit from the structures disclosed herein in that the outermost layer of the multi-layer coating is composed of a material that is printable to be able to deliver a message or include a company's logo and/or name, and in that the innermost layer of the multi-layer coating is immediately adjacent a first major surface of a scrim that has a plurality of interstices and the innermost layer penetrates the interstices to define a portion of the second major surface of the scrim. The innermost layer provides a sufficiently high coefficient of friction to the second major surface of the scrim that it is slip resistant and or has grippable qualities for roofing and/or lumber wrap.

In one aspect, roofing underlayments are disclosed that include a scrim defining a plurality of interstices and a multi-layer polyolefin-based coating on one major surface of the scrim. The multi-layer polyolefin based coating has a first layer of a copolymer of ethylene juxtaposed to the major surface of the scrim and penetrating the interstices thereof to define a portion of the second major surface of the scrim, thereby imparting the second major surface with a sufficiently high coefficient of friction. The copolymer of ethylene may be a copolymer with propylene and/or other monomers, butane, vinyl acetate, methylacrylate, and combinations thereof.

A core layer between the innermost and outermost layers may be of a material that provides improved high temperature resistance, hydrostatic resistance, abrasion resistant, and/or toughness to the end product. In one embodiment, the core layer includes polypropylene.

In a lumber wrap embodiment, the two outer layers of the coating have a lower melting point than the core layer. The lower melting point for the outer layers allows the coating layer to be welded at a lower temperature to the scrim, thereby reducing the loss of strength of the scrim. The coating layer forms welded bonds through the scrim, in particular, through the interstices in the scrim, thereby significantly increasing the peel strength of the weld(s). Of the two outer layers, the first layer of a copolymer of ethylene is juxtaposed to the major surface of the scrim and penetrating the interstices thereof to define a portion of the second major surface of the scrim, thereby imparting the second major surface with a sufficiently high coefficient of friction. The copolymer of ethylene may be a copolymer with propylene and/or other monomers, butane, vinyl acetate, methylacrylate, and combinations thereof.

The multi-layer polyolefin-based coating includes at least three layers including a core sandwiched between the first layer of a copolymer of ethylene and a second layer of a copolymer of ethylene, wherein the core is immediately adjacent to each of the layers of copolymer of ethylene. In one embodiment, the first layer and the second layer of copolymer of ethylene may be the same or may be different. In one embodiment, the core includes polypropylene, preferably a homopolymer of polypropylene. The core may comprise about 20% to about 80% by weight of the total weight of the multi-layer polyolefin-based coating, and the remainder of the total weight may be split equally or unequally between the first layer and the second layer of copolymer of ethylene. In one embodiment, the remainder of the total weight is split as about 70% to about 5% to the first layer, with the balance in the second layer of copolymer of ethylene.

In one embodiment, the scrim is a woven scrim made of polyethylene, polypropylene, copolymers thereof, and/or combinations thereof and the interstices therein define 10% to 40% of the surface area thereof. In another embodiment, the interstices define 15% to 25% of the surface area of the woven scrim. The woven scrim may have a leno weave.

In another embodiment, the scrim is a knitted scrim of polyethylene or polypropylene, and the interstices therein define 10% to 40% of the surface area thereof. In another embodiment, the interstices define 15% to 25% of the surface area of the woven scrim.

BRIEF DESCRIPTION OF THE DRAWINGS

The claimed subject matter is described with reference to the accompanying drawings. A brief description of each figure is provided below. Elements with the same reference number in each figure indicate identical or functionally similar elements. Additionally, the left-most digit(s) of a reference number indicate the drawing in which the reference number first appears.

DETAILED DESCRIPTION

Figure 1:
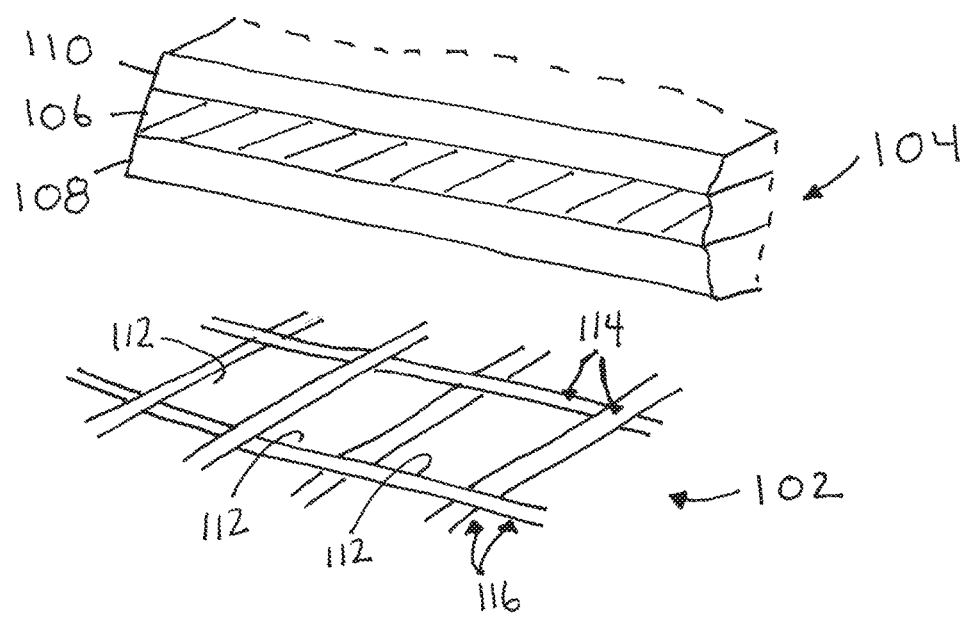
FIG. 1 is a generalization of a coextruded coating being applied to a scrim.

The following detailed description will illustrate the general principles of the invention, examples of which are additionally illustrated in the accompanying drawings. In the drawings, like reference numbers indicate identical or functionally similar elements.

As used herein, "sufficiently high coefficient of friction" has the meaning set forth in the background section.

As used herein, "low density polyethylene" (LDPE) means a polyethylene polymer that has a high degree of short and long chain branching and a density range of 0.910 to 0.940 g/cm$^3$.

As used herein, "linear low density polyethylene" (LLDPE) means a polyethylene polymer that is substantially linear, with a significant number of short branches, is commonly made by copolymerization with short-chain olefins such as 1-butene, 1-hexene, and 1-octene, and has a density range of 0.915 to 0.925 g/cm$^3$.

Figure 2:
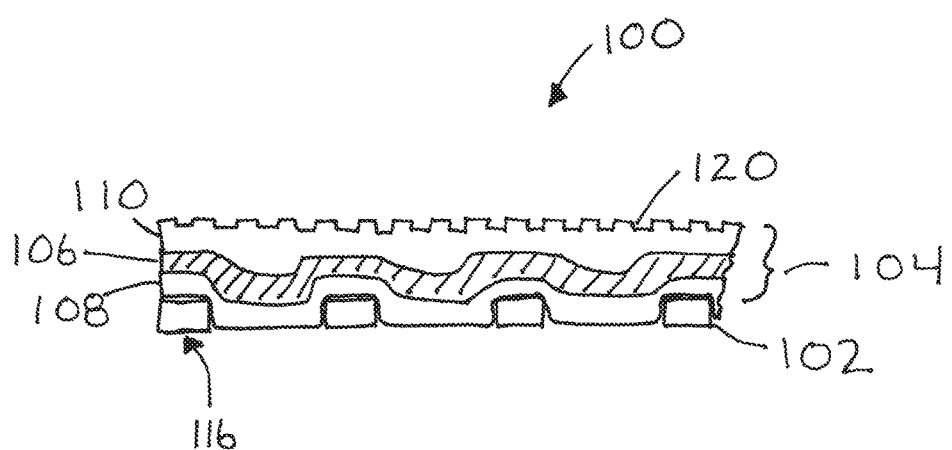
FIG. 2 is a cross-sectional, plan view of one embodiment of a scrim coated product disclosed herein.

Referring to FIGS. 1 and 2, the coated scrim product, generally designated 100 in FIG. 2, has an A/B/A or A/B/C multi-layer polyolefin-based coating 104 coextruded onto a first major surface 114 of a scrim 102, which enables the first layer 108 of the coating to penetrate the interstices 112 thereof and to define a portion of the second major surface 116 of the scrim 102. That is, the coating 104 includes two outer layers 108, 110 (A) or (A and C) and a core layer 106 (B) therebetween, with layer 108 being referred to herein as the first layer and layer 110 being referred to as the second layer. In one embodiment, the outer layers are compositionally equal and (A) comprises an ethylene copolymer. In another embodiment, the outer layers are compositionally different (A and C), but both comprise a copolymer of ethylene and/or propylene. In one embodiment, the outer layers 108, 110 of copolymer of ethylene and/or propylene may either or both include other monomers, such as butene, vinyl acetate, methyl acrylate, and/or additives.

Scrim

The scrim 102 may be a woven or knitted scrim having interstices therein that define about 10% to about 40% of the surface area thereof, measured relative to the first major surface 114 of the scrim to which the multi-layer coating is applied. In another embodiment, the interstices define 15% to 25% of the surface area of the woven scrim. In one embodiment, the woven scrim is a leno weave scrim. The scrim is made typically from polyolefin materials, such as polyethylene, polypropylene, copolymers and other combinations thereof, provided in the form of tapes, filaments, and/or fibers. The tapes, filaments, and/or fibers may have a denier value ranging from about 200 to about 2000. In one embodiment, the scrim has from 4 to 12 tapes, filaments, and/or fibers in the warp direction and from 2 to 8 tapes, filaments, and/or fibers in the weft direction woven in a pattern to meet the percentage of surface area defined by the interstices as set forth above. In one exemplary embodiment, the scrim is made from polypropylene material in the form of tapes having an 8×3 weave with four polypropylene warp pairs each tape being 0.9" wide and 650 denier and three weft tapes each being 0.115" wide and 1200 denier, and having interstices defining about 20% of the surface area of the first major surface of the scrim.

Multi-Layered Coating

The multi-layered coatings 104 of the various embodiments are suitable for extrusion coating onto the scrim 102. Extrusion coating of a multi-layered coating 104 onto the scrim may be accomplished by melting the compositions for the coating in two or more extruders and extruding through a multi-port film die onto the scrim the layers in a desired layered arrangement, such as, but not limited to, an A/B/A or A/B/C arrangement. The molten coextruded layers and scrim are transported between a nip roll and a chill roll to cool the molten compositions to create the coating. A chill roll temperature of 45° F. to 85° F. is commonly used.

The core layer (B) is or includes polypropylene, and may optionally include one or more additives, such as the additives identified below. In one embodiment, the polypropylene is a homopolymer. The core layer typically accounts for about 10% to about 90% of the total thickness of the multi-layer coating. In another embodiment, the core layer accounts for about 20% to about 80% of the total thickness of the multilayer coating. In yet another embodiment, the core layer accounts for about 30% to about 70% of the total thickness of the multi-layer coating. The total weight of the coating can vary from about 20 g/m$^2$ to about 150 g/m$^2$, and preferably about 40 g/m$^2$ to about 100 g/m$^2$.

The polypropylene in the core layer may be mixed or blended with other polyolefins. In one embodiment, the polypropylene is mixed with one or more of a low density polyethylene (LDPE), a linear low density polyethylene (LLDPE), ethylene methyl acrylate (EMA), ethylene vinyl acetate (EVA) or other ethylene copolymers, preferably in a minor amount relative to the amount of polypropylene. In this embodiment, the polypropylene is a homopolymer of polypropylene. In one embodiment, the core layer may include about 1% to about 20% by weight of these other polyolefins, or more preferably about 5% to about 15% by weight thereof, or even more preferably about 8% to about 10% by weight thereof. In one embodiment, the core layer includes a homopolymer of polypropylene and a minor amount of an LDPE. The core layer has a Vicat softening point of greater than about 120° C. as determined by ASTM D1525B, ISO 1183, or the manufacturer's adopted test method that is typically comparable thereto.

The first layer and the second layer copolymer of ethylene and/or propylene account for the balance (about 10% to 90%) of the total thickness of the multi-layer coating. The contribution of the first and second layers (A) or (A and C) to the total thickness of the film may be equal or unequal. For example, if the core accounts for 40% of the thickness of the film, then the two outer layers account for 60% of the thickness of the film, which may be divided as 30% of the thickness for each outer layer. Conversely, if the core accounts for 40% of the thickness of the film, then the balance may be divided unequally, for example as 20% of the thickness contributed by the first layer and 40% of the thickness contributed by the second layer or vice versa, or 10% of the thickness contributed by the first layer and 50% of the thickness contributed by the second layer or vice versa, etc.

The copolymer of ethylene and/or propylene may be propylene-ethylene copolymers, an ethylene-butene copolymer, an ethylene-vinyl acetate copolymer, an ethylene-methyl acrylate copolymer, and combinations thereof and may include optional additional polyethylene or polypropylene mixed therewith and/or one or more additives, such as the additives identified below.

An ethylene copolymer that is characterized as having a high tack, sticky nature is a good choice for the end products disclosed herein because it will provide the second major surface of the scrim with a higher coefficient of friction, i.e., good grip, less slippage. Such ethylene copolymers have a melt flow rate in a range of about 5 g/10 min to about 50 g/10 min as determined by ASTM D1238 with 2.16 kg at 230° C. or the manufacturer's adopted test method that is typically comparable thereto, more preferably a range of about 10 g/10 min to about 40 g/10 min, and even more preferably a range of about 20 g/10 min to about 35 g/10 min. These ethylene copolymers, in addition to the melt flow rate range expressed above, have a Vicat softening temperature in a range of about 30° C. to about 110° C. as determined by ASTM D1525 or ISO 1183, or the manufacturer's adopted test method that is typically comparable thereto, more preferably a range of about 30° C. to about 90° C., and even more preferably a range of about 30° C. to about 60° C. Some example copolymers that fall within the melt flow rate and the Vicat softening temperature are available under the brands VERSIFY™ by Dow Chemical Company, VISTAMAXX™ by ExxonMobil, and ADFLEX® by LyondellBasell Industries Holdings B.V.

In another embodiment, the copolymer may be a styrene block copolymer, such as styrene-ethylene-butadiene block copolymer (SEB), styrene-ethylene-butadiene-styrene block copolymer (SEBS), or styrene-ethylene-propylene-styrene (SEPS) block copolymer, having a melt flow rate and a Vicat softening point within the ranges set forth above. Examples of these polymers are available under the brand KRATON® by Kraton Performance Polymers, Inc.

Additives

The coatings may optionally incorporate additives in amounts up to 30% by weight in one layer, each layer, or in all the layers combined and include, but are not limited to, antioxidants, UV stabilizers, flame retardant agents, slip agents, antiblock additives, printable additives, paper match additives, polar additives, colorants, pigments, and anticorrosion additives. Hindered phenols (e.g., IRGANOX® 1010) are useful antioxidant additives that may be incorporated in the coatings, as are phosphites (e.g., IRGAFOS® 168). Examples of suitable UV stabilizers are TINUVIN® 328 and CHIMASSORB® 944. The additives IRGANOX® 1010, IRGAFOS® 168, TINUVIN® 328, and CHIMASSORB® 944 are all registered trademarks of, and supplied by, BASF SE, a company of Germany. Useful flame retardant agents are readily commercially available from A. Schulman of Akron, Ohio, Clariant of Easton, Md., and Ampacet of Tarrytown, N.Y. or Techmer PM of Clinton, Tenn. Examples of suitable slip agents are erucamide and stearamide (either separately or in combination). Suitable paper match additives are readily commercially available from A. Schulman of Akron, Ohio.

When used, pigments and colorants may be added as part of a color masterbatch. The color masterbatch is formed by combining the pigments (colorant) with a polypropylene and/or polyethylene carrier compatible with the polyolefin coatings. In general, compatible carriers can be determined by creating extruded melt blends and testing for phase separation in the extrudate. The color masterbatch may be added to one or more layers in the multi-layer coating or to all the layers in the multi-layer coating.

Embossing

The scrim coated products herein may also include an embossed surface 120. In particular, as shown in FIG. 2, the second layer of sticky polyolefin copolymer (i.e., the outermost layer thereof) may be embossed with a pattern to further enhance the anti-slip performance thereof. The method of embossing the surface imparts an unevenness to the surface thereto, thereby increasing the roughness of the surface, which improves wet slip resistance of the product. There is also an improved physical grip of a shoe to the embossed surface.

The embossing process may be part of a continuous manufacturing process. The embossing process may involve applying heat and pressure while running the scrim coated product through a nip assembly, one roll of which has a positive of the pattern to be embossed thereon. Embossment may also be undertaken on a printing press just prior to printing the roofing underlayment. Embossment may also be carried out by extrusion coating onto a patterned chill roll or by direct embossment after cooling on a smooth chill roll.

The embossment pattern may be of any type as long as it increases the roughness of the outermost surface of the coating. For example, and not as a limitation, in one embodiment an embossment pattern is a sand pattern or a diamond pattern. In another embodiment, the pattern is a small scale decorative pattern made up of interlocking diamond shapes.

WORKING EXAMPLES

Example 1

Roofing Underlayment Product

An 8×3 weave of four polypropylene warp pairs of 650 denier each, 0.09" wide tapes and a three count weft of 1200 denier, 0.115" wide tapes defined the woven scrim for this embodiment of a roofing underlayment product. This woven scrim provided interstices defining about 20% of the surface area of one major surface of the scrim, the major surface to which a multi-layer polyolefin coating was applied.

The coating, an A/B/A coextrusion coating, was coextruded onto one major surface of the woven scrim. Layer A included about 1% by weight of a UV masterbatch, about 10% by weight of a beige color masterbatch, about 8% by weight of an antiblock masterbatch, about 10% by weight of a homopolymer of polypropylene, and about 70% by weight of a propylene-ethylene copolymer having a melt flow rate of 25 g/10 min and a Vicat softening temperature of 33° C., which is available from Dow Chemical as VERSIFY™ 4301. Layer B included about 1% by weight of a UV masterbatch, about 10% by weight of a beige color masterbatch, about 8% by weight of an LDPE, and about 81% by weight of a homopolymer of polypropylene. The Vicat softening temperature of the homopolymer of polypropylene in the B layer is greater than the Vicat softening temperature of the propylene-ethylene copolymer in the A layer. The Vicat softening temperature of the homopolymer of polypropylene may be about 150° C. to about 154° C. with a load of about 10 N used in the testing method.

The outermost layer (A) opposite the second surface of the scrim was embossed to have a textured pattern. This was accomplished using a heated, patterned roll that used pressure from a nip roll to emboss the pattern onto the surface of the coating.

The above roofing underlayment was made in a first trial to have a coating of 2.0 mil and in a second trial to have a coating of 3.0 mil. These two trials, having the coextruded multilayer coating applied on only one side of the scrim, were compared against Applicant's own commercially available two-sided anti-slip coated scrim, roofing underlayment available under the brand name NOVASEAL™ roofing underlayment.

Tables 1-4: Summary of Results of Embossed Trials compared to NOVASEAL™ roofing underlayment tested with an English XL Tribometer (Slip Tester on a scale of Slip Index from 0 to 1.0)

TABLE 1

Rubber Foot against embossed outer layer opposite the second surface of the scrim

| Sample Identification | WET TESTING Slip Index Value of Failure | DRY TESTING Slip Index Value of Failure |
|---|---|---|
| Trial 1 (2.0 mil) | 0.6 | 1.0 |
| Trial 2 (3.0 mil) | 0.7 | >1.0 |
| NovaSeal AP | 0.7 | >1.0 |

TABLE 2

Rubber Foot against the second surface of the scrim

| Sample Identification | WET TESTING Slip Index Value of Failure | DRY TESTING Slip Index Value of Failure |
|---|---|---|
| Trial 1 (2.0 mil) - scrim side | 0.6 | 0.9 |
| Trial 2 (3.0 mil) - scrim side | 0.5 | 0.9 |
| NovaSeal AP - back side (grey) | 0.4 | 0.9 |

TABLE 3

Neolite Foot against embossed outer layer opposite the second surface of the scrim

| Sample Identification | WET TESTING Slip Index Value of Failure | DRY TESTING Slip Index Value of Failure |
|---|---|---|
| Trial 1 (2.0 mil) | 0.6 | >1.0 |
| Trial 2 (3.0 mil) | 0.7 | >1.0 |
| NovaSeal AP | 0.6 | >1.0 |

TABLE 4

Neolite Foot against the second surface of the scrim

| Sample Identification | WET TESTING Slip Index Value of Failure | DRY TESTING Slip Index Value of Failure |
|---|---|---|
| Trial 1 (2.0 mil) - scrim side | 0.5 | 0.8 |
| Trial 2 (3.0 mil) - scrim side | 0.5 | 0.9 |
| NovaSeal AP - back side (grey) | 0.3 | 0.8 |

The Embossed Outer Layer: As demonstrated by the comparative analysis found in Tables 1-4, the two trial roofing underlayment materials, Trials 1 and 2, with the coextruded, multilayer coating applied to just one side of the scrim, performed generally, equally well under both wet and dry testing of the embossed outer layer against the rubber foot and the neolite foot as compared to the NOVASEAL™ AP roofing underlayment.

The Second Surface of the Scrim: Importantly, the second surface of the scrim in Trials 1 and 2, which in these two roofing underlayment materials has the coating penetrating the interstices of the scrim to define at least a portion of the second surface of the scrim, showed superior results by outperforming the NOVASEAL™ AP roofing underlayment under wet testing against both the rubber foot and the neolite foot. Also, the second surface of the scrim in Trials 1 and 2, performed generally, equally well under dry testing against the rubber foot and the neolite foot as compared to the NOVASEAL™ AP roofing underlayment.

Example 2

Lumber Wrap Product

An 8×3 weave of four polypropylene warp pairs of 650 denier each, 0.09" wide tapes and a three count weft of 1200 denier, 0.115" wide tapes defined the woven scrim for this embodiment of a lumber wrapping product for use in an automatic wrapping machine such as disclosed in U.S. Pat. Nos. 7,594,375; 7,607,280; 7,836,666; and 7,997,050. This woven scrim provided interstices defining about 20% of the surface area of one major surface of the scrim, the major surface to which a multi-layer polyolefin coating was applied.

The coating, an A/B/A coextrusion coating, was coextruded onto one major surface of the woven scrim. Layer A included about 1% by weight of a UV masterbatch, about 10% by weight of a beige color masterbatch, about 8% by weight of an antiblock masterbatch, about 10% by weight of a homopolymer of polypropylene, and about 70% by weight of a propylene-ethylene copolymer available from Dow Chemical as VERSIFY™ 4301. Layer B included about 1% by weight of a UV masterbatch, about 10% by weight of a beige color masterbatch, about 8% by weight of an LDPE, and about 81% by weight of a homopolymer of polypropylene. The melting point of the homopolymer of polypropylene in the B layer is about 160° C., and the melting point of the propylene-ethylene copolymer in the A layer is about 64° C.

The embodiments of this invention shown in the drawings and described above are exemplary of numerous embodiments that may be made within the scope of the appended claims. It is contemplated that numerous other configurations of the scrim coated products may be created taking advantage of the disclosed approach. In short, it is the Applicant's intention that the scope of the patent issuing herefrom be limited only by the scope of the appended claims.

What is claimed is:

1. A protective covering comprising:
   a scrim comprising warp and weft members that define a plurality of interstices, the scrim having a first major surface and an opposing second major surface; and
   a multi-layer coating applied to the first major surface of the scrim with a first layer juxtaposed to the first major surface and a core layer on an opposed surface of the first layer relative to the first major surface, the first layer being penetrated into the interstices of the scrim to co-define, with the warp and weft members, the opposing second major surface of the scrim;

wherein the first layer has a melting point below 100° C., and comprises a copolymer of ethylene;

wherein the core layer comprises polypropylene and makes up about 10% to about 90% of a total thickness of the multi-layer coating; and wherein the co-defined opposing second major surface of the scrim has a coefficient of friction of at least 0.5 when tested with dry leather and at least 0.7 when tested with dry rubber.

2. The protective covering of claim 1, wherein the copolymer of ethylene comprises, as a copolymer with the ethylene, one or more of propylene, butane, vinyl acetate, and methylacrylate, or is a styrene block copolymer.

3. The protective covering of claim 1, wherein the multi-layer coating is coextruded onto the scrim.

4. The protective covering of claim 1, wherein the polypropylene is a homopolymer of polypropylene.

5. The protective covering of claim 4, wherein the homopolymer of polypropylene has a greater Vicat softening temperature than the copolymer of ethylene.

6. The protective covering of claim 4, wherein the homopolymer of polypropylene is mixed with a minor amount of low density polyethylene.

7. The protective covering of claim 1, wherein the core layer further comprises one or more of low density polyethylene, linear low density polyethylene, ethyl vinyl acetate, ethylene methyl acrylate, or copolymers of ethylene in a minor amount relative to the amount of polypropylene in the core layer.

8. The protective covering of claim 1, wherein the multi-layer coating has an A/B/A or A/B/C construction with a first A layer being the first layer of the multi-layer coating.

9. The protective covering of claim 8, wherein the second A layer or the C layer has an embossed major outermost surface.

10. The protective covering of claim 1, wherein the interstices of the scrim define about 10% to about 40% of the surface area of the opposing second major surface of the scrim.

11. The protective covering of claim 1, wherein the scrim is a woven or knitted material.

12. The protective covering of claim 1, wherein the plurality of warp and weft members each have a denier value in the range of about 200 to about 2000 denier.

13. The protective covering of claim 1, wherein the scrim comprises four to twelve warp members and two to eight weft members.

14. The protective covering of claim 1, wherein the protective covering is lumber wrap or roofing underlayment.

15. The protective covering of claim 1, wherein the multi-layer coating further comprises, in one or more layers thereof, a UV stabilizer.

16. The protective covering of claim 1, wherein the polymer present in the core in the greatest amount has a Vicat softening temperature greater than that of the copolymer of ethylene.

17. The protective covering of claim 16, wherein the Vicat softening temperature of the polymer in the core is greater than 120° C., and a Vicat softening temperature of the first layer comprising the copolymer of ethylene and a polymer of an opposing skin layer, disposed on an opposite side of the core from the first layer, are both less than 80° C.

18. The protective covering of claim 16, wherein a melting point of the polymer in the core is greater than 120° C., and a melting point of a polymer in a skin layer of the multi-layer coating opposite the first layer relative to the core has a melting point less than 100° C.

19. The protective covering of claim 1, wherein the copolymer of ethylene has a melt flow rate of about 5 g/10 min to about 50 g/10 min.

* * * * *